United States Patent [19]

Rausing

[11] Patent Number: 4,512,838
[45] Date of Patent: Apr. 23, 1985

[54] EXTRUDED LONGITUDINAL JOINT

[75] Inventor: Anders R. Rausing, Lausanne, Switzerland

[73] Assignee: Tetra Pak Developpement SA, Pully, Switzerland

[21] Appl. No.: 459,700

[22] Filed: Jan. 20, 1983

[30] Foreign Application Priority Data

Jan. 20, 1982 [SE] Sweden .............................. 82002890

[51] Int. Cl.³ ............................................ B29D 23/10
[52] U.S. Cl. .................................... 156/203; 156/218; 156/229; 156/244.24; 156/244.27; 156/308.4; 156/311; 156/322; 156/498
[58] Field of Search ............... 156/203, 218, 229, 228, 156/308.4, 311, 322, 498, 499, 244.24, 244.27

[56] References Cited

U.S. PATENT DOCUMENTS

| | | | |
|---|---|---|---|
| 3,597,292 | 8/1971 | Takeda | 156/218 |
| 4,379,014 | 4/1983 | Rausing et al. | 156/229 |
| 4,405,400 | 9/1983 | Petersen-Hos | 156/244.24 |

Primary Examiner—Jay H. Woo
Assistant Examiner—Timothy W. Heitbrink
Attorney, Agent, or Firm—Burns, Doane, Swecker & Mathis

[57] ABSTRACT

A method for joining together laminated material including layers of orientation-stretched polyester and glycol-modified polyester. A strand of molten glycol-modified polyester is applied to the laminated material along the joining area and the laminated material is pressed together while the strand is cooled. The laminated material is joined together by transferring heat from the molten strand to the pressed-on layers of the laminate. The surface portions of the layers are melted at the same time as the strand is cooled.

6 Claims, 4 Drawing Figures

EXTRUDED LONGITUDINAL JOINT

BACKGROUND AND SUMMARY OF THE PRESENT INVENTION

The present invention relates generally to a method for joining laminated materials. More specifically, the present invention relates to a method for performing the joining together of two laminated materials including layers of orientation-stretched plastic material. The present invention also relates to a casing of plastic material joined together in accordance with the method.

It is known that in connection with packages a polyester material of good mechanical characteristics is used which, moreover, can be substantially improved when the laminated material is orientation-stretched. In order to utilize in full the good tensile strength characteristics of the material e.g. in packages containing pressurized contents (beer, refreshing drinks, etc.), the material should be biaxially oriented, i.e. in two directions at right angles to one another so that full use can be made of the material to absorb the tensile stresses emanating from the contents. The orientation of the material comes about by stretching the material at a temperature between 70°-90° C. either simultaneously or in two separate operations in two directions at right angles to one another. By this procedure, in addition to the molecular orientation aimed at and the substantially improved tensile strength capacity, a reduction of the thickness of the material in proportion to the stretching is also achieved. A normal orientation-stretching in biaxially oriented polyester material brings about a stretching of the material of 4 to 5 times in two directions at right angles to one another, which represents a surface enlargement of the material of 16 to 25 times. At the same time as the tensile strength characteristics of the polyester material are substantially improved, a crystallization of the polyester material also takes place, as a result of which the material cannot be heat-sealed. If the material is heated a shrinkage of the material will occur as the material endeavors to return to the form it had before the orientation-stretching. This characteristic, namely that the oriented polyester material cannot be heat-sealed, has greatly limited the possibility of using it for the manufacture of packages and the material has been used chiefly in the field of packaging for packages which are formed only by blowing or deep-drawing and do not contain any sealing joints.

However, in recent times modified polyester materials have been produced which can be stretched to a substantial degree without any crystallization or, more correctly, with only partial crystallization of the material. Such a modified polyester is a glycol-modified polyester which in general is designated PETG. The glycol-modified polyester can be readily laminated to ordinary polyester material, preferably by a co-extrusion operation, and, since the material is very closely akin, the adhesion obtained between the polyester layer and the PETG layer is so good that it is hardly possible to separate the two laminated layers. When the laminate is orientation-stretched the polyester layer crystallizes, while the modified polyester layer (PETG layer) crystallizes considerably more slowly and is heat-sealable at least up to an orientation stretching of 20-25 times. This means that an orientation-stretched laminate can also be heat-sealed, but now the problem arises, that a heating of the material brings about a shrinkage of the heated area. This shrinkage can be avoided in principle if during the heating and sealing operations the material is kept tightly pressed together, so that a shrinking movement of the material is rendered impossible, in this case, however, the orientation in the heated area is lost and the material consequently loses its strength in this area.

What is wanted, therefore, is a joining together which is mechanically strong but can be performed without the laminated material being heated so that it shrinks or so that the molecular orientation is lost.

The method according to the present invention is a joining together which solves the problem. In the method in accordance with the present invention a narrow strand of molten plastic material of the same or similar type as that which constitutes the material layers intended for joining together is applied to one or both the laminated materials along the intended joining area. The two material layers intended for joining together are then pressed together along the joining area while they take up between them the molten strand of plastic material. When heat is transferred from the plastic strand to the adjoining surfaces of the material layers intended to be joined together, a fusing together of material takes place between the surfaces and the plastic strand applied.

BRIEF DESCRIPTION OF THE DRAWING

In the following some preferred embodiments of the invention will be described with reference to the enclosed schematic drawings, wherein.

DETAILED DESCRIPTION OF THE PREFERRED EMBODIMENT

Figure 1:
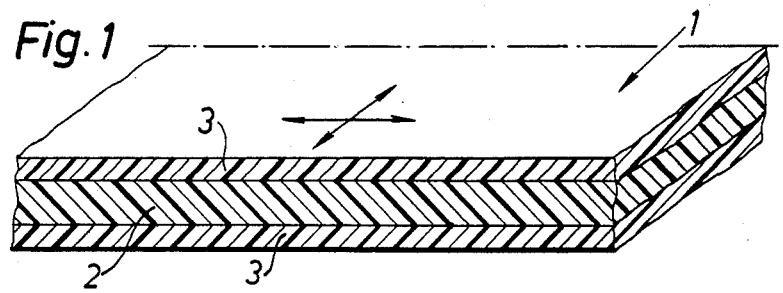
FIG. 1 is a perspective view of a co-extruded, but not orientation-stretched, laminate including a polyester layer which on both sides is combined with layers of glycol-modified polyester.

In FIG. 1 is shown schematically a section of a sheet or of a web of a laminated material 1 having a central layer 2 of polyester and outer layers 3 of a so-called glycol-modified polyester (PETG). This material is manufactured preferably by joint extrusion or so-called co-extrusion, that is to say the plastic materials are melted and joined together as molten plastic layers before they are pressed out at high pressure through a tubular or slotted die. Owing to the plastic material being joined together in molten condition already before the squeezing out through the extruder die, an intimate fusing together in the interface area between the different layers is achieved. Since the plastic materials included in the laminate are very closely akin, they combine with one another in the laminate in such a manner that it is hardly possible to separate the layers after the extrusion operation.

In practice the co-extruded material in accordance with FIG. 1 can have a thickness between 1-5 mm, and to increase the tensile strength capacity of the material it is orientation-stretched in two directions at right angles to one another, as indicated by arrows in FIG. 1. This orientation-stretching, which may be forced as far as 4 to 5 times the original dimensions in both directions (in extreme cases even farther), causes the thickness of the material to be reduced and its surface to be increased to a corresponding degree. If the drawing is carried out at a temperature between 70°–90° C. a so-called molecular orientation of the material is obtained, which means that its tensile strength increases to a substantial degree at the same time as the extensibility of the material diminishes.

Such a molecular orientation may be carried out by a number of different methods, either through an operation in two stages, where the material is stretched first in one direction and then in the other direction or with the help of specially designed machines. In these machines a web or sheet of the laminate in accordance with FIG. 1 can be fixed along its lateral edges in jaws arranged on chains. These jaws are movable in such a manner that consecutive jaws on the pulling chains are moved in relation to each other (the distance between the jaws is increased), and also the pulling chains diverge, with the result that the material is stretched simultaneously in two directions at right angles to one another. Since the polyester material is strong and has good tensile strength capacity, even a non-oriented state, very large pulling forces are needed for the orientation-stretching of a material which is as thick as 5 mm.

Figure 2:
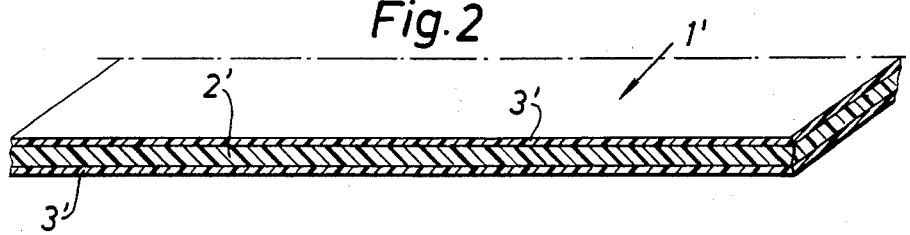
FIG. 2 is a perspective view of the material in accordance with FIG. 1 after it has been biaxially orientation-stretched.

After the orientation-stretching a substantially thinner material in accordance with FIG. 2 is obtained. In this laminated material the central layer 2' has been strongly oriented and has crystallized, whereas the outer layers 3' of glycol-modified polyester have largely retained their amorphous structure and have crystallized only to a minor extent. However, these outer glycol-modified polyester layers 3' can also crystallize during the orientation-stretching, and if the orientation stretching is continued farther than 25 times the original dimensions, problems arise also in respect of the heat-sealing of the layers 3'.

As mentioned previously, it is difficult to heat-seal the material even if the outer layers 3' of glycol-modified polyester largely retain their amorphous structure and therefore can be heat-sealed. The reason for this is that the oriented material shrinks on heating, and that it loses its orientation and consequently its strength. It is possible, though, to carry out the sealing, if the heating is confined to the outer layers 3' of glycol-modified polyester, that is to say the central layer 2' of polyester is not allowed to be heated to such an extent that the orientation stresses are released. However, such a local heating of the glycol-modified polyester layers 3' is difficult to perform, since the layers 3' after the orientation-stretching have geen greatly reduced in their thickness. Local heating with hot air or heat radiation has proved to be insufficient and in order to supply an amount of energy sufficient for sealing, the heat supplied will diffuse to the adjoining orientation-stretched, crystalline polyester layer 2, as a result of which the orientation stresses are released.

Figure 3:
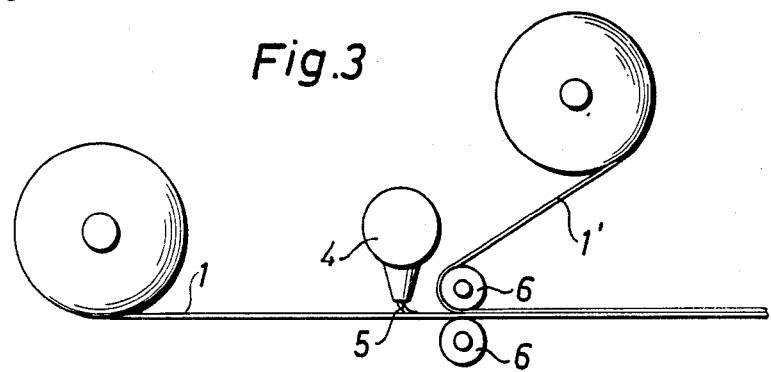
FIG. 3 is a schematic side elevational view of a method for joining together a web of orientation-stretched material in accordance with FIG. 2 with a web of the same kind with the help of a strand of plastic material which is applied by an extrusion process.

A method which has proven to work, however, is the method in accordance with the invention which is illustrated in FIG. 3. According to FIG. 3 a biaxially oriented laminate web 1 of the type which is shown in FIG. 2 is coated with a strand 5 of glycol-modified polyester which is pressed out through the die of an extruder 4. The molten plastic strand 5 is covered immediately by a second web 1 of laminated material of the type as shown in FIG. 2, whereupon the two laminated materials are pressed together between cooling rollers 6 while they take up between them the molten plastic strand 5. It has been found that the size of the plastic strand 5 can be adapted in such a manner that its heat content will be sufficient to heat the surface layers 3' of glycol-modified polyester, which are located on the outsides of the laminated material 1. The heating of the surfaces of the laminate layers 3' will be so great that a fusing together between the laminate layers 3' and the extruded strand 5 is achieved. While the molten plastic strand 5 heats the adjoining portions of the layers 3' to melting, the strand is cooled as it is stabilized and it solidifies together with the molten surface portions of the layers 3'. This stabilization of the joint is achieved by the cooling rollers 6 which, moreover, in an effective manner cool the outside of the material to prevent the heat from diffusing into the central, orientation-stretched polyester layer 2' and heating the same to above 90°–100° C. where the orientation stresses would be released. The temperature of the extruded plastic strand may be approx. 300° C. and it has been found that in most cases the width of the strand should be between 3–10 mm and its thickness a little greater than the laminated layers with which the strand 5 is to be combined.

By adapting the heat content in the strand 5 to the thickness of the laminated layer and by cooling externally the laminate by the cooling rollers 6, which at the same time function as pressure rollers, it is thus possible to supply a sufficient amount of heat to the sealing layers 3' so as to melt their surface. This, however is done without heating the central, molecular-orientated polyester layer 2' to such a degree that the orientation stresses are released.

Figure 4:
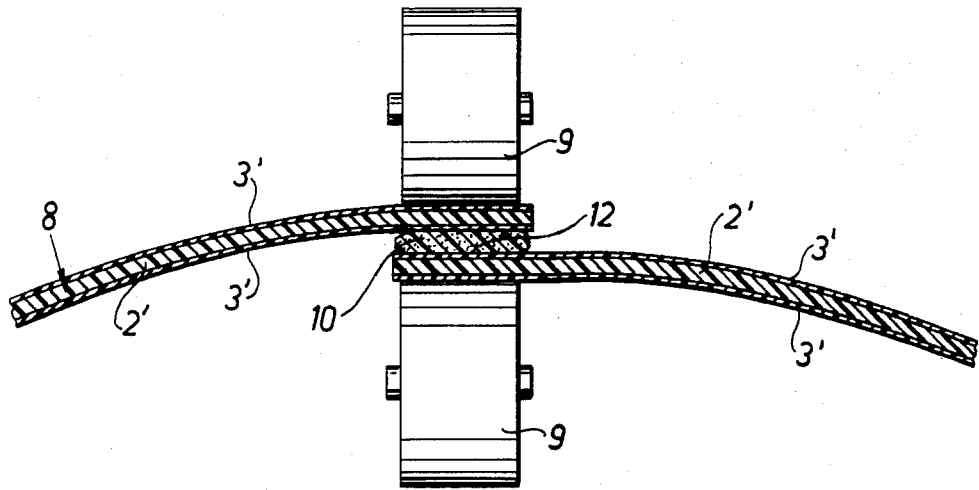
FIG. 4 is a front elevational view of part of an apparatus used to manufacture a casing from a web or a sheet of a molecular-oriented laminated material in accordance with FIG. 2.

In connection with the manufacture of containers for pressurized contents (beer, refreshing beverages etc.) it is desired to form an orientation-stretched laminated material in accordance with FIG. 2 to a cylindrical casing, where great demands are made on the strength of the joint between the overlapping edge portions of the casing material. Now it has been found that in accordance with FIG. 4 a sealing joint can be produced which withstands pressures inside the casing of over 4 kg/square centimeter in a steady state at a relatively high temperature (that is to say, the demands which are made on a packing container for beer and refreshing beverages). The overlap joint on the casing 8 shown in FIG. 4 is produced in principle in the same manner as the joining together of two laminated materials shown in FIG. 3. It is a precondition that the casing 8 is a material of the type which is shown in FIG. 2, but the material in accordance with FIG. 2 may be complemented, of course, with further layers so as to obtain a good gas barriers, e.g. aluminium foil, Saran (polyvinylidene chloride) etc. In accordance with FIG. 4 sheets or a web of the biaxially oriented polyester laminate, whose outer surfaces are made of glycol-modified polyester, are formed into a tube, in that the longitudinal edges of the sheet or web are made to overlap one another. Immediately before the overlapping operation a plastic strand 10 of glycol-modified polyester (PETG) is extruded onto one edge region 12, whereupon the edge regions 12 of the casing 8 are directly pressed together between cooled pressure rollers 9 which cool the plastic layers present from the outside of the laminate. At the same time the heat from the molten plastic strand 10 is transferred to the adjoining layers of glycol-modified polyester which are fused together with the strand 10 so as to form a strong sealing connection. The casing 8 formed can be closed at one end in various ways and filled with contents, whereupon the casing 8 is closed at its other end. It has been found that casings manufactured in accordance with the invention withstand great pressures without the longitudinal joint being ruptured, and the casings, moreover, are inexpensive to manufacture. Because of the present invention, a considerably greater freedom has been achieved in the choice of package design with the utilization of orientation-stretched polyester, since sealing joints can become part of the package produced, and as a result the invention contributes to the creation of improved and less expensive packages for pressurized contents.

The principles, preferred embodiments and modes of operation of the present invention have been described in the foregoing specification. The invention which is intended to be protected herein should not, however, be construed as limited to the particular forms disclosed, as these are to be regarded as illustrative, rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

I claim:

1. A method for heat-sealing together two portions of orientation-stretched laminated polyester material, each portion of said material including a central layer of polyester positioned between two surface layers of glycol-modified polyester, comprising:

depositing a strand of molten plastic material of sufficient size on a first one of the two surface layers of glycol-modified polyester along an intended joint area so that the strand will have sufficient heat content to heat the two surface layers of glycol-modified polyester joning a second one of the two surface layers of glycol-modified polyester to said strand so as to form a joined material having a joint area; and, fusing the first and the second surface layers of the glycol-modified polyester to the strand while cooling the joint area to prevent heat from the molten strand of plastic material from diffusing into said central layer of polyester.

2. The method in accordance with claim 1 wherein the joined material has a central layer and a pair of outer layers and wherein said strand is extruded and is of a material similar to the material which constitutes the outer layers of the joined material.

3. The method in accordance with claim 1, wherein the joint area during the joining operation is cooled from the outside of the joined material.

4. The method in accordance with claim 2, wherein the extruded plastic strand is constituted of glycol-modified polyester.

5. The method in accordance with claim 4, wherein the width of the extruded strand is between 3–10 mm and that its thickness is between 100–500 $\mu$m.

6. The method in accordance with claim 5 wherein the thickness of the extruded strand is 300 $\mu$m.

* * * * *